Patented Oct. 9, 1934

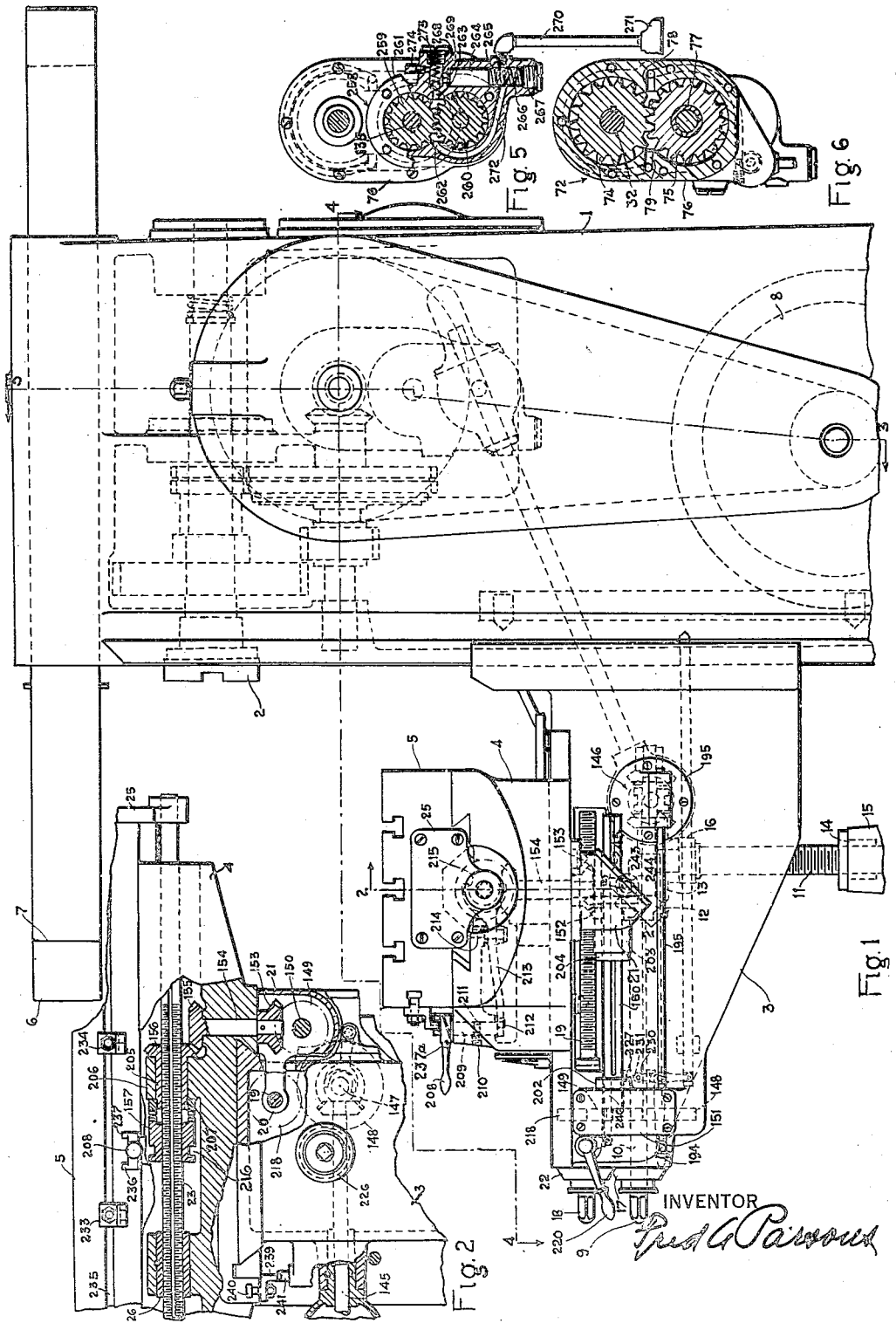

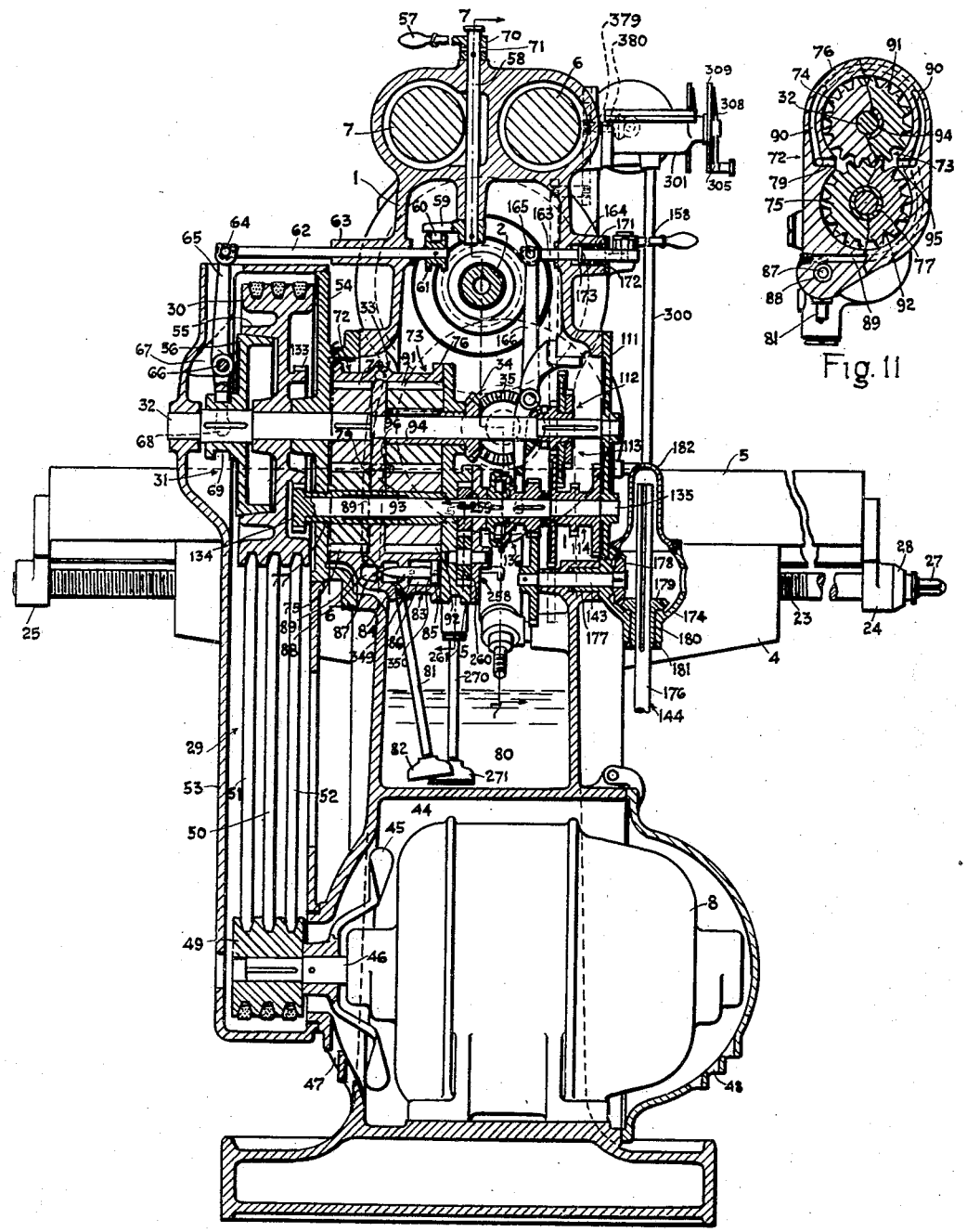

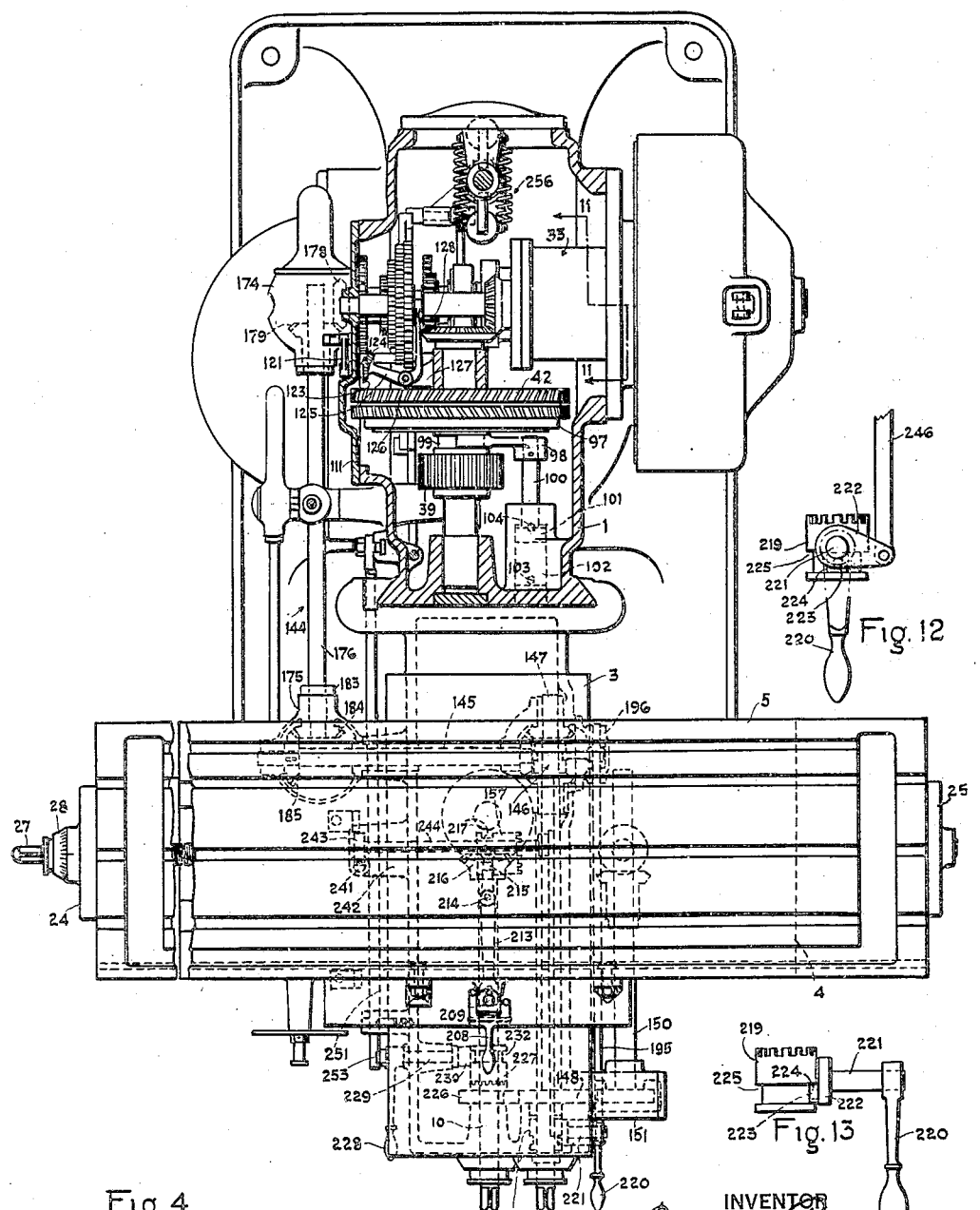

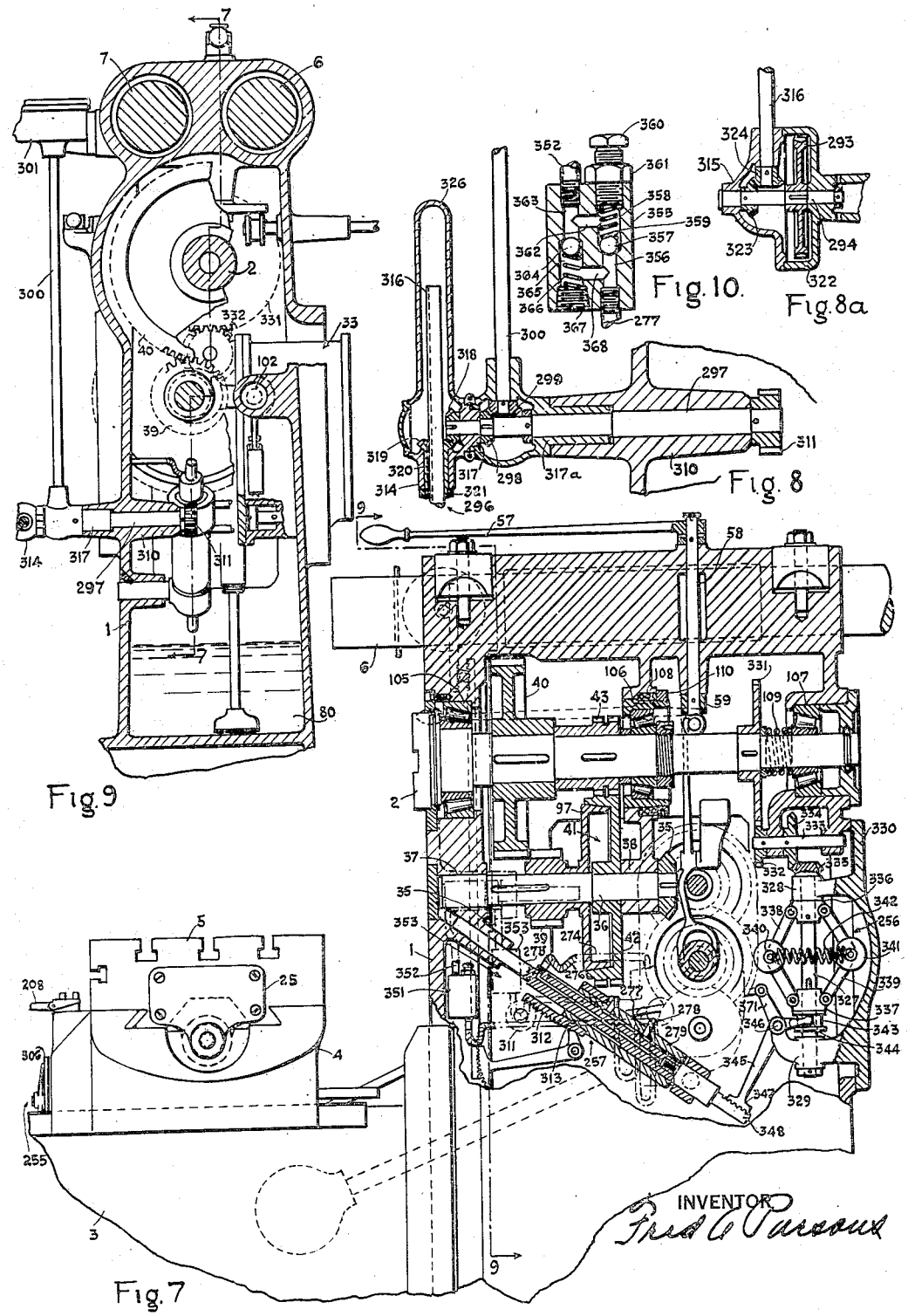

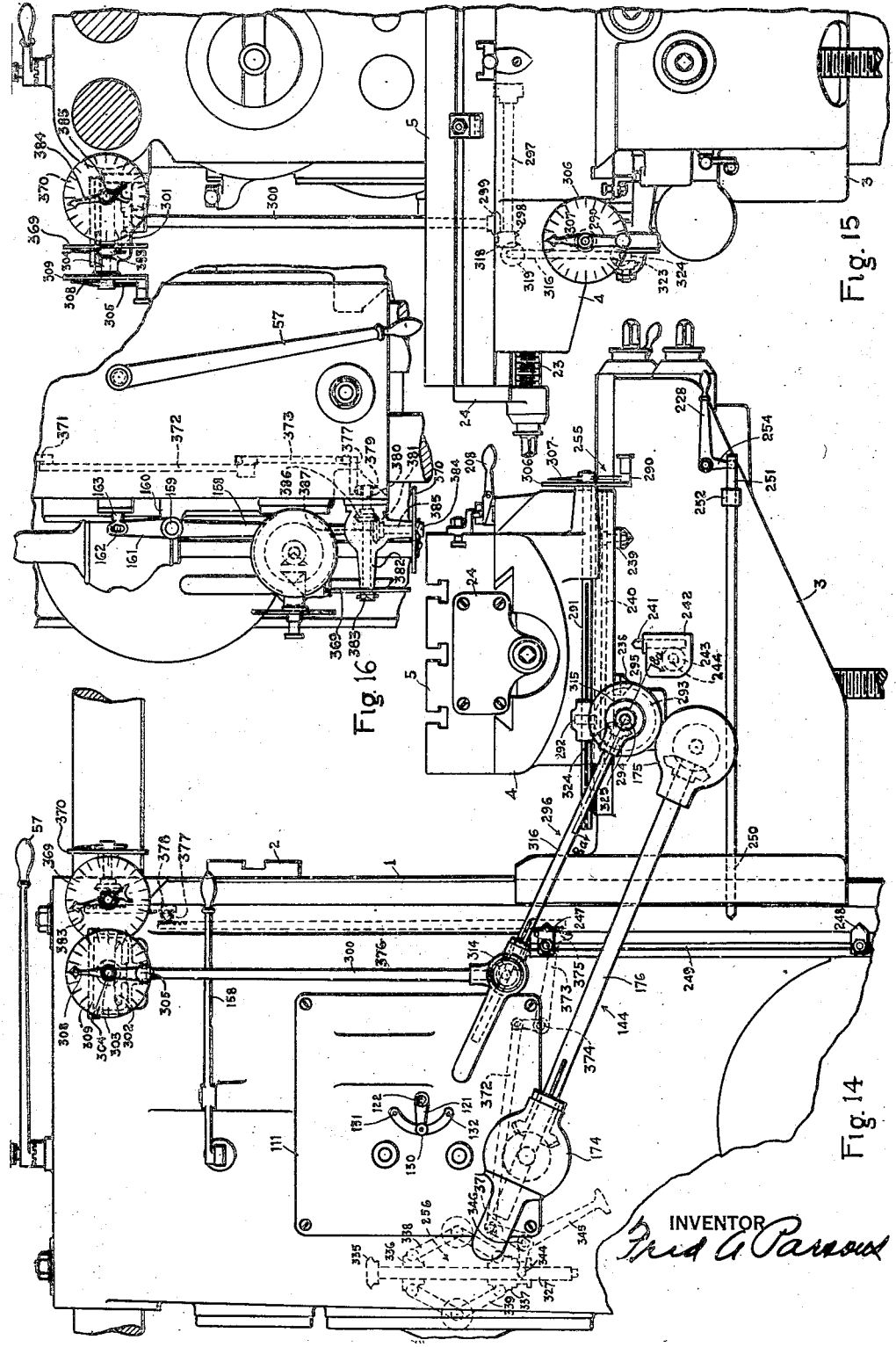

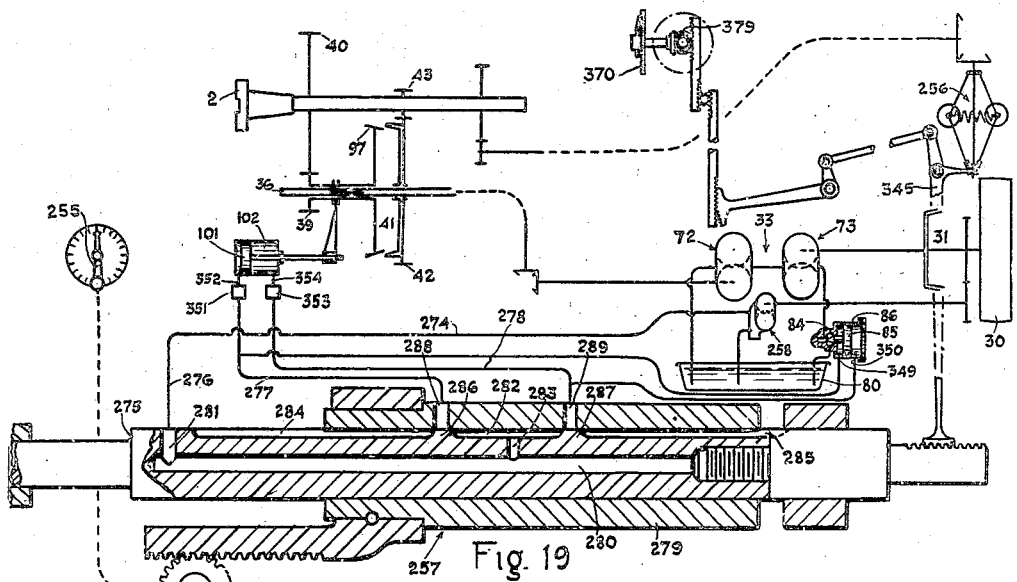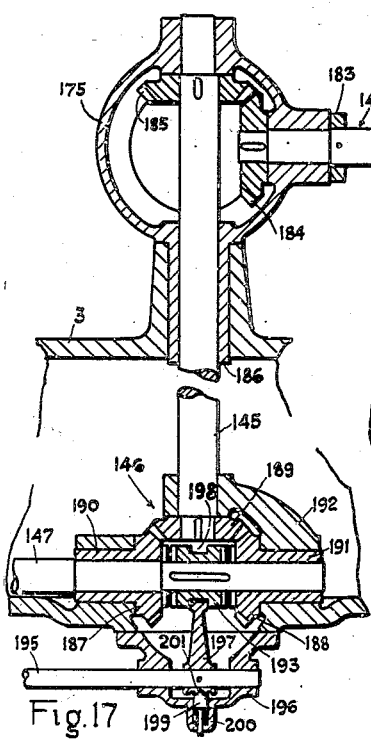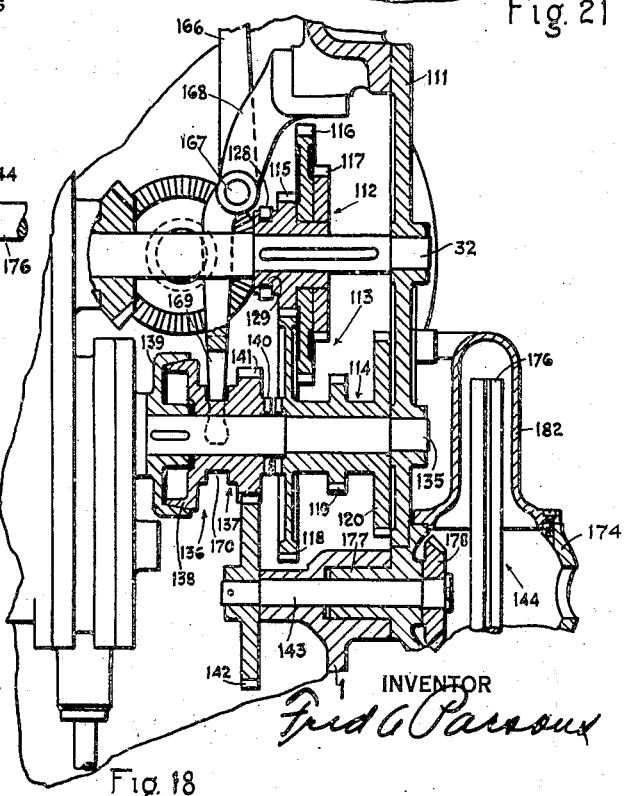

1,976,368

UNITED STATES PATENT OFFICE 1,976,368

TRANSMISSION AND CONTROL MECHANISM FOR MACHINE TOOLS

Fred A. Parsons, Milwaukee, Wis., assignor to Kearney & Trecker Corporation, West Allis, Wis.

Application August 25, 1932, Serial No. 630,407

9 Claims. (Cl. 90—21)

This invention relates primarily to variable speed mechanism and control means for effecting changes in the rate effected thereby.

It is a purpose to provide a machine tool transmission capable of a wide total range of rates and with a great number of available intermediate rates.

A further purpose is to provide a rate changer with control mechanism adapted to automatically maintain a desired rate in spite of variations in operating conditions, and a further purpose is to provide a rate changer having control mechanism for maintaining any selected preferred one of a variety of available rates substantially constant in spite of various operating factors tending to cause the rate to vary.

A further purpose is to provide a rate changer with control mechanism for the power shifting thereof in accordance with a manual selection of rates available.

A further purpose is to provide a rate changer with a power operable shifter automatically operative to effect a particular rate in accordance with a previous selection.

A further purpose is to effect the various objects above enumerated, singly or in combination in a rate changer in which a portion is adjustable to effect relatively large increments of rate change and another portion is adjustable to effect small increments of rate change in modification of the rate effected by the portion having large rate change effect.

A further purpose is to effect the above objects singly or in combination, using a rate changer which is hydraulic in its nature, at least for that portion providing relatively small increments of rate change as just previously referred to.

A further purpose is to effect the above objects singly or in combination, using for the rate changing mechanism a power device which is hydraulic in its nature.

A further purpose is to effect the above objects singly or in combination by means of mechanism particularly improved with respect to operation of the main or tool spindle of a milling machine or more particularly for the spindle of that type of milling machine commonly referred to as a knee type milling machine.

A further purpose is to effect the above objects singly or in combination by the means of mechanism particularly improved in its relation to other portions of the structure or mechanism of a milling machine and especially in a knee type milling machine.

A further object is generally to improve and simplify the construction and operation of milling machines, particularly those of the knee type previously referred to, and still other objects will be apparent from this specification and the claims included herein.

In the drawings:

Fig. 1 is a right side elevation of a machine incorporating the invention, parts being broken away.

Fig. 2 is a partial front elevation of the same machine in section on the line 2—2 of Fig. 1.

Fig. 3 is a view of the machine in substantially vertical section on the line 3—3 of Fig. 1.

Fig. 4 is a plan view of the machine partly in section on the line 4—4 of Fig. 1.

Fig. 5 is a vertical sectional view on the line 5—5 of Fig. 3.

Fig. 6 is a similar view on the line 6—6 of Fig. 3.

Fig. 7 is a right side view partly in vertical section on the line 7—7 of Fig. 3.

Fig. 8 is an enlarged sectional detail of certain mechanism indicated in Fig. 4.

Fig. 8a is a section on line 8a—8a of Fig. 14.

Fig. 9 is a front view in vertical section on the line 9—9 of Fig. 7.

Fig. 10 is a vertical sectional view of a device indicated in Fig. 7.

Fig. 11 is a vertical sectional view on the line 11—11 of Fig. 4.

Figs. 12 and 13 are enlarged details of certain mechanism indicated in Fig. 4.

Fig. 14 is a left side elevation of the machine with parts broken away.

Fig. 15 is a front elevation thereof, partly broken away.

Fig. 16 is a partial plan view of the machine showing particularly certain control and indicating mechanism.

Fig. 17 is an enlarged sectional detail of certain mechanism indicated in Figs. 4 and 14.

Fig. 18 is an enlarged view of a portion of Fig. 3.

Fig. 19 is an enlarged sectional view of a control valve indicated in Fig. 7 with a diagrammatic showing of the various operative connections thereof.

Fig. 20 and 21 are fragmentary sections of the same showing the parts in different positions.

Like reference characters have been applied to the same parts throughout the drawings and specification.

As shown in Fig. 1, the machine illustrative of the invention comprises a column, base, or support 1 forming a foundation for the other parts of the machine, the column supporting for rotation therein a tool spindle, support, or element 2. The column also supports in suitable manner for vertical sliding movement a knee or support member 3 which in turn carries for sliding movement toward and away from column 1 a saddle or support member 4, carrying for reciprocation in a path transverse to the axis of spindle 2 a work table or support member 5, suitable guides being provided for facilitating such movement and provided with gibs, or the like, for familiar purposes and of well known type not particularly pointed out in the present instance. Overarms 6 and 7 are slidably supported in an upper portion of column 1 for cooperation with the work supports and spindle 2 in various ways well understood in the art, and the various supports and spindle 2 may be driven from a power source 8 through suitable devices and transmissions or mechanism which will be fully described below.

Knee 3 may be raised and lowered by hand by the use of a crank, or the like, not shown, applied to a squared portion 9 of a shaft 10 journaled in knee 3 and driving an elevating screw 11 through bevel gears 12 and 13 fixed respectively with the shaft and screw, the screw engaging a nut 14 fixed with a pedestal 15 uprising from a portion of column 1 in well known manner and supporting knee 3 on a suitable thrust bearing 16. Rotation of the screw from shaft 10 will accordingly cause vertical movement of the knee and the supports carried thereby, and for accurate setting of the parts a dial 17 is movably mounted on shaft 10 to indicate movements of the shaft and accordingly of knee 3.

Saddle 4 may be moved by hand by means of a crank, or the like, not shown, applied to a squared portion 18 of a screw 19, the screw being journaled in a front portion of knee 3 and restrained against axial movement relative thereto. A nut portion 20, Fig. 2, is fixed with a housing member 21 depending from saddle 4, rotation of screw 19 causing movement of the nut, and accordingly of the saddle toward or from column 1. For determining accurately the extent of such movement, a dial 22 is adjustably fixed with screw 19.

Hand movement of table 5 may be obtained by means of a table screw 23 journaled in suitable bearings 24 and 25, Fig. 3, and prevented thereby from moving axially relative to table 5, the screw engaging a nut portion 26, Fig. 2, fixed in any suitable manner with saddle 4, the rotation of the screw by means of a crank, or the like, not shown, applied to a squared portion 27 of the screw accordingly causing sliding movement of table 5 in familiar manner. For setting up the machine, or other uses, where accurate determination of table movement is required, a dial 28, Fig. 3, is adjustably fixed with table screw 23 in well known manner.

The train for driving spindle 2 is as follows: Power source 8 may be of any suitable form, but in the present instance is indicated as a familiar type of electric motor, the motor driving, through a suitable transmission, in the present instance indicated as a multiple V-belt drive generally denoted by numeral 29, Fig. 3, a pulley 30, constituting part of a main clutch generally denoted by numeral 31. Clutch 31 drives a shaft 32 which actuates, through a rate change device generally denoted by numeral 33, a bevel gear 34. Gear 34 drives, through a bevel gear 35, as more particularly shown in Fig. 7, a shaft 36 journaled in suitable bearings 37 and 38 in column 1 and driving spindle 2 alternatively through gears 39 and 40 or through a clutch 41 engaging a gear 42 which in turn drives the spindle through a gear 43, the last described gears constituting another rate change device.

Drive 29 comprises a sheave 49 fixed with motor shaft 46 and driving above mentioned pulley 30 through V-belts 50, 51, 52, the drive being completely enclosed in a casing or guard 53 suitably fixed with column 1 and with a member 54 forming a closure for a portion of column 1 and a bearing for above mentioned shaft 32.

Clutch 31 comprises an outer member 55 fixed with pulley 30 and an inner member 56, the members having interengaging friction surfaces for engagement when member 56 is moved to the right as seen in Fig. 3. Pulley 30 is journaled on shaft 32 while member 56 is slidably keyed to the shaft, the pulley running free except when connected to the shaft through clutch member 56. Member 56 may be moved for engagement with member 55 from hand lever 57, the lever projecting into a position within easy reach of an operator and being clutched to a shaft 58 vertically journaled in an upper portion of column 1. Shaft 58 extends downwardly between overarms 6 and 7 and actuates, through a lever 59 fixed therewith and engaging by means of a pin, or the like, 60, a spool 61 fixed with a shifter rod 62. Rod 62 is slidably supported in a suitable guide portion 63 and engages, through a pin 64, a forked end portion of a lever 65 fulcrumed on a stud 66 fixed with a bracket portion 67 projecting from an inner surface of guard 53. Lever 65 has a forked end portion 68 engaging an annular groove 69 formed in a portion of inner clutch member 56. Movement to the left and right of lever 65 will accordingly cause respectively right and left movement of clutch member 56 and accordingly engagement or disengagement of clutch 31.

Lever 57, as above noted, is clutched to shaft 58 and may be released therefrom by raising the hub portion 70 thereof, clutch teeth 71 disengaging upon such movement and permitting swinging of the lever into any position desired without affecting shaft 58 or clutch 31. Releasing the lever allows it to drop back and reengage clutch teeth 71, whereupon it becomes operative in a new position. The position of the lever may accordingly be readily changed into various relations with other parts of the machine to suit the convenience of the operator and the work at hand.

Spindle 2 may be of any suitable or well known type, but in the present instance is of a type fully described and claimed in a patent to Fred A. Parsons, August 11, 1931, No. 1,818,089, and need not be particularly described herein except to note that it is mounted in three anti-friction type bearings generally denoted by numerals 105, 106, and 107, Fig. 7, the bearings being widely spaced apart for purposes fully disclosed in the above identified patent. Springs 108 and 109 serve to maintain the bearings in continuous adjustment, and a nut, or the like, 110 is operative for effecting certain other adjustments of the bearings, all as fully described in the patent.

Rate changer 33 in the present instance is shown as of a fluid operated or hydraulic type, but it is to be understood that other rate changers either of fluid operated, mechanical, or any other suitable or well known type are contemplated as equally applicable in the present mechanism, the illustrated type of rate changer being merely exemplary. The rate changer disclosed comprises a fluid pump generally denoted by numeral 72 driven from shaft 32 and supplying fluid to a fluid motor generally denoted by numeral 73, the motor in turn driving above mentioned bevel gear 34. Pump 72, as more particularly shown in Fig. 6, comprises gears 74 and 75 meshed together within a suitable housing 76, gear 74 being fixed with above mentioned shaft 32, and gear 75 being journaled on a sleeve 77 fixed with and extending through housing 76, the gears and housing comprising a well known form of gear pump, rotation of the gears drawing fluid through an intake port 78 and expelling it through an outlet or discharge port 79. The fluid induced through port 78 is drawn from a reservoir 80, Fig. 3, through a suitable suction pipe 81, a strainer or the like 82 being provided for obvious purposes.

The rate of admission of fluid to pump 72 is governed by a throttle generally denoted by numeral 83, the throttle comprising a tapered plunger 84 slidable in a suitable bore in a portion of housing 76 and shiftable by power means including a piston head 85 slidable in a cylinder 86, fluid pressure in the cylinder determining the position and effecting movements of plunger 84. Plunger 84 cooperates with a port 87, changes in the position of the plunger causing corresponding changes in the effective area of port 87 and accordingly of the rate of fluid flow therethrough. Port 87 communicates with a chamber 88 from which leads a passage 89 communicating with pump inlet port 78. Fluid discharged through port 79 flows through a passage 90, as more particularly shown in Fig. 11, to motor 73.

Motor 73, as more particularly shown in Fig. 11, comprises gears 91 and 92 meshed together within a portion of housing 76 separated from pump 72 by a suitable partition 93, Fig. 3, gear 91 being fixed with a sleeve portion 94 journaled on shaft 32 and gear 92 being journaled on a portion of above mentioned sleeve 77. The fluid enters the motor through a port 95 communicating with passage 90, see Fig. 11, and the spent fluid returns to reservoir 80 through an exhaust port 96, Fig. 3. Sleeve 94 carries above mentioned bevel gear 34, the power of the motor being transmitted therethrough to spindle 2 as above described.

Although the pump and motor used have been described in considerable detail, it is to be understood that any suitable type of pump or motor may be used in the machine within the contemplation of the present invention, as, for example, those shown in a preceding application, Serial No. 498,288, filed November 26, 1930, or in the issued patent to Thoma, 1,656,544, of January 17, 1928. In each of these an adjustable displacement pump provides the rate adjustment here furnished by means of a throttle. It is equally contemplated that the rate adjustment might be accomplished by a variable displacement motor, or by the use of a pump and motor, both of which are adjustable.

Although the spindle transmission is so arranged as to give in the present instance a single direction of rotation in spindle 2, it is contemplated that mechanism of any suitable type might be incorporated in the train at any proper point to provide a selective reverse of the direction of spindle rotation. Many such devices are familiar and well known in their application to such power trains as the present, and accordingly are not illustrated in the present embodiment. It will be apparent, however, that a reversing mechanism of the type utilizing a plurality of bevel gears might be readily substituted for gears 34 and 35, thus permitting reversing of shaft 36 and accordingly of spindle 2.

Gear 39, as particularly shown in Fig. 7, is fixed with an inner member 97 of above mentioned clutch 41, the two being slidably keyed with shaft 36 and member 97 having a suitable friction surface for engagement with a complementary surface in gear 42, the gear being journaled on shaft 36 whereby to allow free rotation of the shaft except when clutch 41 is engaged. Upon movement of gear 39 to the left it engages with above mentioned gear 40 to provide a series of relatively low speeds in spindle 2 responsive to the setting of rate changer 33. Upon movement of gear 39 to the right it disengages from gear 40 and subsequently clutch member 97 engages with gear 42, the relative sizes of gears 42 and 43 resulting in a series of relatively high rates in spindle 2 also responsive to the setting of rate changer 33. Gears 42 and 43 may be of any suitable or well known type, in the present instance in the interests of quiet operation the gears being of double helical or so-called "herringbone" type. The provision of the friction engagement between member 97 and gear 42 prevents any substantial shock which might otherwise occur upon engagement of the last described gearing owing to the relatively high speed and consequent considerable inertia of spindle 2 and its attached parts.

Gear 39 and clutch member 97 may be shifted by power means consisting in the present instance of a shifter member 98, more particularly shown in Fig. 4, engaging an annular groove 99 between gear 39 and member 97, the member being fixed with the piston rod 100 having fixed therewith a piston head 101 reciprocable in a cylinder 102. Fluid pressure acting in cylinder 102 through ports 103 and 104 may be accordingly caused to shift the gear and clutch member. Provision has thus been made for controlling movements of spindle 2 throughout a wide range of speeds by power, in the present instance in the form of fluid pressure. The source and control of this fluid pressure will be taken up in detail below.

A power train for feed movement of the various work supports originates in shaft 32. As particularly shown in Figs. 3, 18, the shaft extends across column 1 and is supported in a suitable bearing in a closure member 111, the shaft having slidably keyed therewith a gear member generally denoted by numeral 112 and constituting part of a rate changer generally denoted by numeral 113, a gear member 114 also constituting part of rate changer 113 and forming the terminal element of the feed train. Gear member 112 comprises gears 115, 116, and 117 engageable one at a time with gears 118, 119, 120 respectively by a shifting movement of gear member 112, the gears being of different sizes whereby engagement of different pairs will result in different speeds in gear member 114. Shifting of gear member 112 may be obtained from a hand lever 121, Fig. 14, fixed with a shaft 122 journaled in closure member 111 and actuating, through a bevel gear 123, Fig. 4, a sector 124 fixed with a shifter lever 125 fulcrumed on a stud 126 fixed with a bracket portion 127 extended from a portion of column 1. Lever 125 has a shifter fork 128 engaging an annular groove 129, Fig. 18, formed in gear member 112, movement of lever 121 accordingly causing shifting of gear member 112. Lever 121 has a grip portion 130, Fig. 14, constituting a well known form of spring pressed plunger engageable with holes such as 131 and 132 for maintaining the parts in shifted positions.

A rapid traverse train for movement of the various work supports originates in a gear 133, Fig. 3, fixed with pulley 30 and driving, through a gear 134, a shaft 135, the shaft accordingly running at all times when pulley 30 is driven, regardless of the condition of engagement of clutch 31. Rapid traverse movement of the work supports is accordingly available at times when clutch 31 is disengaged. Feed movement, however, is dependent on engagement of clutch 31, since it originates in shaft 32. The work supports accordingly cannot be driven at a feed rate unless spindle 2 is operating. The feed and rapid traverse trains combine in a feed-rapid traverse selector clutch generally denoted by numeral 136, Figs. 3, 18.

Clutch 136 comprises a member generally denoted by numeral 137 journaled on shaft 135 and having a portion 138 provided with a suitable friction surface for engagement when the member is moved, for example, to the left in Fig. 18 with a friction surface formed on a clutch member 139 fixed with shaft 135, the member also being provided with suitable clutch teeth 140 for engagement when moved to the right with complementary clutch teeth on gear member 114 which, as above noted, is journaled on shaft 135. Movement of member 137 to the left will accordingly result in a relatively high rate of movement of shaft 135, while movement of member 137 to the right will cause engagement of clutch teeth 140 and movement of member 137 at a relatively low or feed rate. Member 137 has fixed therewith a gear 141 having a relatively wide face and driving in the various positions of the member a gear 142 from which the drive proceeds to the work supports, as follows:

Gear 142 is fixed with and drives a shaft 143 which drives, through a movable drive shaft generally denoted by numeral 144, a shaft 145, Figs. 4, 17, journaled in knee 3 and driving, through a reverser generally denoted by numeral 146, a shaft 147, Fig. 1. Shaft 147 extends forwardly in knee 3 and has fixed therewith a gear 148, Fig. 2, from which the power is distributed to the various work supports. Thus gear 148 drives, through a gear 149, a shaft 150 extending backwardly from a housing portion 151, Figs. 1 and 4, fixed with knee 3 and driving, through bevel gears 152 and 153, Fig. 1, a vertical shaft 154, more particularly shown in Fig. 2. Shaft 154 drives, through a bevel gear 155, a bevel gear 156 which may be clutched to above mentioned table screw 23 by means of a movable clutch member 157.

Selector clutch 136, Fig. 18, may be shifted from hand lever 158, Figs. 3 and 16, fulcrumed on a stud 159 fixed with an extending bracket portion 160 fixed with column 1, the lever having an arm 161 engaging, through a pin 162, a shifted rod 163. Rod 163, as more particularly shown in Fig. 3, is slidable in a guide portion 164 projecting from column 1 and actuates, through a pin 165, a lever 166, Fig. 18, fulcrumed on a stud 167 fixed with a bracket portion 168 extending inwardly from column 1. Lever 166 has a forked end portion 169 engaging an annular groove 170 in clutch member 137. Movement of lever 158 to the left and right, as seen in Fig. 3, will thus cause corresponding movement of clutch member 137, Fig. 18, and accordingly shifting respectively into rapid traverse or feed. Member 137 is normally continuously maintained in its right or feed position by means of a spring 171, Fig. 3, received in a suitable bore in guide portion 164 and acting between a closure member 172 fixed with the guide and a collar 173 fixed with the shifter rod. The normal expansion of the spring maintains clutch member 137 in the position stated, the spring yielding upon actuation of lever 158 to permit movement of the parts to the opposite position.

Drive shaft 144 may be of any suitable or well known type, but in the present instance comprises housings 174 and 175, more particularly shown in Fig. 14, connected by a rotatable shaft 176. Housing 174, as more particularly shown in Fig. 18, is pivotally supported from column 1 axially with shaft 143 by suitable means such as a sleeve 177 journaled in a suitable bore surrounding shaft 143, the shaft being journaled in the bore of sleeve 177 and having fixed therewith within the housing a bevel gear 178. Gear 178 drives a bevel gear 179, Fig. 3, also within housing 174, the gear having a hub portion 180 journaled in a suitable bearing in housing 174 and carrying a collar, or the like, 181 whereby the gear is supported against axial movement relative to the housing. Hub portion 180 is slidably keyed with above mentioned shaft 176 whereby rotation will be transmitted to the shaft in various axial positions thereof. A cover portion 182 is fixed with housing 174 and serves to house the portion of shaft 176 projecting through gear 179. Shaft 176 is journaled in a portion of housing 175, Fig. 17, and suitably prevented from axially moving therein as, for example, by means of a collar 183, the shaft driving above mentioned shaft 145 through bevel gears 184 and 185 meshed together within the housing and fixed respectively with the shafts. Housing 175 is pivotally supported from knee 3 by suitable means such, for example, as a sleeve 186 received in a bore in the knee coaxial with shaft 145. The above arrangement provides a connection from the stationary column to the relatively movable knee which will transmit the feed or rapid traverse movement in a uniform manner and which will not be affected adversely by vertical movements of knee 3, the housings 174 and 175 pivoting about their respective supporting sleeves upon movements of the knee, and shaft 176 sliding through gear 179 in consequence of the changing center distance between shafts 143 and 145. It will be noted that gear 178, Fig. 4, is disposed on the opposite side of shaft 176 from gear 185. This is done to preserve the angular relationship between shafts 143 and 144 in various positions of knee 3, the rotation imparted to shaft 154 by angular movement of housing 174 about shaft 143, assuming gear 178 stationary, being neutralized by a corresponding angular movement of housing 175 about shaft 145, shaft 145 accordingly not partaking in the angular movement of housing 175.

Reverser 146 comprises bevel gears 187 and 188, Fig. 17, spaced apart and driven in opposite directions by means of a bevel gear 189 fixed with shaft 145, gears 187 and 188 having sleeve portions 190 and 191 respectively fixed therewith and journaled in a housing 192 fixed with knee 3, above mentioned shaft 147 being journaled in the aligned bores of the sleeves. A clutch member 193 is slidably keyed with shaft 147 between gears 187 and 188 and has suitable clutch teeth for engagement, when moved, for example, to the left, with complementary clutch teeth on gear 187. The clutch also has suitable teeth for engagement, when moved to the right, with complementary clutch teeth on gear 188, an intermediate or neutral point in the travel of the clutch member in which it is not in engagement with either gear 187 or 188 being provided. Clutch member 193 may be shifted by hand from a control member 194, Fig. 1, fixed with a shifter rod 195 extending backwardly adjacent an outer wall of knee 3 into a closure member 196, Figs. 4, 17, fixed with housing 192, the rod being slidable and carrying within housing 192 a shifter fork 197 engaging an annular groove 198 formed in clutch member 193. Sliding movement of rod 195 will accordingly cause shifting of clutch 193 and operation of shaft 147 in one or the other direction, a detent plunger 199 slidable in a sleeve 200 fixed with closure member 196 engaging suitable notches such as 201 formed in a portion of shifter fork 197 for yieldingly retaining the parts in shifted positions.

Above mentioned gear 149 is disposed in above mentioned housing portion 151, Fig. 1, fixed with knee 3, shaft 150 being journaled in a bearing 202 fixed with the housing, the shaft extending backwardly along knee 3 into above mentioned housing portion 21, gear 152 having an extending sleeve portion 203 journaled in housing 21 and restrained from axial movement relative thereto by means of a collar, or the like, 204. Sleeve 203 is slidably keyed with shaft 150, whereby housing 21 and gear 152 may follow movements of saddle 4 without affecting the driving relation between the mechanism in knee 3 and vertical shaft 154.

Bevel gear 156, as seen in Fig. 2, has an extended sleeve portion 205 journaled in a suitable bearing 206 fixed with saddle 4, the sleeve being restrained against axial movement by means of a clutch member 207 fixed with the sleeve and having suitable clutch teeth for engagement with above mentioned clutch member 157. Sleeve 205 has a bore loosely embracing above mentioned table screw 23, while clutch member 157 is slidably keyed with the screw and may be shifted to the right and left into and out of engagement respectively with clutch member 207. Member 157 may be so shifted from hand lever 208, the lever being fixed with a vertical shaft 209, Fig. 1, journaled in a suitable bore in saddle 4 and retained therein by means of a set screw, or the like, 210 loosely engaging a groove 211 in the shaft. Shaft 209 actuates, through an eccentric pin 212, a shifter lever 213 fulcrumed on a stud 214 fixed with saddle 4, the lever being provided with a shifter fork portion 215 engaging, through pivoted shoes, or the like, 216, Fig. 4, an annular groove 217 in clutch member 157. Shifting of lever 208 to the left and right will accordingly cause corresponding movement of clutch member 157, engagement of clutch 157 by movement of the lever to the right causing actuation of table 5 in a direction responsive to the setting of reverser 146.

For power movement of saddle 4 above mentioned gear 148, Fig. 2, drives a gear 218 journaled on above mentioned feed screw 19, the gear being provided with suitable clutch teeth for engagement with a clutch member 219 slidably keyed with screw 19 and movable in and out, as seen in Fig. 4, for engagement or disengagement with gear 218. Clutch member 219 may be shifted from a hand lever 220 fixed with a shaft 221 journaled in a portion of knee 3, see also Figs. 12 and 13, and having fixed therewith within knee 3 a member 222 actuating clutch member 219 through a pin 223 carrying a pivoted shoe, or the like, 224 engaging an annular groove 225 formed in the clutch member. Downward movement of lever 220 will accordingly cause engagement of clutch 219 with gear 218 and power movement of saddle 4 in a direction responsive to the setting of reverser 146.

Power movement of knee 3 may be obtained through a gear 226, Fig. 2, driven from above mentioned gear 148 and journaled upon shaft 10, Fig. 4. Gear 226 may be clutched to the shaft by means of a clutch member 227 slidably keyed on shaft 10 and having suitable clutch teeth for engagement, when moved to the front, as seen in Fig. 4, with complementary clutch teeth formed on gear 226. The clutch member may be shifted from a hand lever 228 fixed with a shaft 229 journaled in a wall of knee 3 and having fixed therewith within the knee an upwardly extending member 230, Fig. 1, carrying a pin, or the like, 231 engaging an annular groove 232, Fig. 4, formed in clutch member 227. Up and down movement of lever 228 will accordingly cause disengagement and engagement respectively of clutch member 227 and accordingly raising or lowering of knee 3 in response to the setting of reverser 146.

Automatic controls for the movements of the various work supports may be provided in well known or suitable manner, in the present instance automatic stop of table 5 being obtainable through dogs 233 and 234, Fig. 2, adjustably fixed with the table in any suitable manner as, for example, by means of bolts engaging a T-slot 235. The dogs encounter respectively upwardly extending pins 236 and 237 fixed with a portion of lever 208, suitable cam surfaces on the dogs cooperating with the pins to shift lever 208 from a position corresponding to engagement of clutch 157 to one corresponding to disengagement thereof. It will be noted that in the present illustrative machine the position of lever 208 is the same for either direction of movement of table 5. The dogs will thus interrupt such movement upon contacting their respective pins during movement of table 5 in either direction. To provide for further movement of the table by power, after operation of the automatic stop mechanism, lever 208 is pivoted to shaft 209 by means of a pin, or the like, 237a, whereby the lever may be tilted after a stop, pins 236 and 237 then avoiding dogs 233 and 234 so that clutch 157 may be reengaged for resumption or reversal of table movement. Any other suitable or convenient automatic control mechanism might be utilized in the machine within the contemplation of the present invention, that disclosed being merely an example of a suitable arrangement.

Automatic control of any suitable type may be provided for movements of saddle 4, in the present instance dogs 238 and 239, Fig. 14, being adjustably fixed with saddle 4 by suitable means such as bolts, or the like, engaging a T-slot 240, the dogs at predetermined points in the movement of saddle 4 encountering a plunger 241, Figs. 4, 14, vertically slidable in a housing 242 fixed with knee 3, the plunger being provided with suitable rack teeth engaging a gear 243 fixed with a shaft 244 journaled in knee 3, the shaft, as more particularly shown in Fig. 1, actuating, through a lever 245 fixed therewith, a pivoted link 246 extending forwardly in knee 3 and pivoted to a lower portion of above mentioned member 222, Fig. 12. Downward movement of plunger 241 will accordingly rotate shaft 244 and through link 246, member 222 thus disengaging clutch member 219 and discontinuing power movement of saddle 4.

Automatic control of movements of knee 3 may be provided in the form of dogs 247 and 248, Fig. 14, adjustably fixed with a portion of column 1 by any suitable means such as bolts engaging a T-slot 249, the dogs having appropriate cam surfaces actuating upon predetermined movement of knee 3, a plunger 250 substantially horizontally slidable in the knee and comprising a shifter rod 251 extending forwardly and guided in a bracket portion 252 extending from an outer surface of knee 3. Rod 251, as more particularly shown in Fig. 4, has a suitable slot engaging, through a pin or the like 253, a downwardly extending portion 254, Fig. 14, of above mentioned lever 228. Downward movement of lever 228, as above explained, will engage clutch 227 and result in movement of knee 3 in a direction responsive to the setting of reverser 146. At the completion of a predetermined amount of such movement, plunger 250 will be forced to the right, as seen in Fig. 14, by contact with one or the other of dogs 247 and 248, thus causing upward movement of lever 228 and disengagement of clutch member 227, such disengagement arresting the movement of knee 3.

It is to be noted that the just described mechanical power trains for movement of the various work supports are shown merely for purposes of example and that other types of power trains well known and of considerably different characteristics might be equally well incorporated in the machine within the contemplation of the present invention. For example, a type of power train and automatic control for movement of table 5 might be incorporated which would provide for automatic reverse of the direction of movement of table 5, such mechanism being well known and forming no part of the present invention. Furthermore, automatic means might be readily provided for changing from a feed rate to a rapid traverse rate, for example, at predetermined points in the movement of the table or any of the work supports. It is further contemplated that fluid actuated mechanism might be substituted for the mechanical trains above outlined for the work support movement without departing from the scope and spirit of the present invention, there being several well known systems or circuits adaptable for this purpose. A suitable transmission of this type is fully disclosed in the issued patent to Fred A. Parsons, No. 1,740,744, December 24, 1929.

The present invention concerns itself more particularly with the means and mechanism used for controlling the rates of rotation of spindle 2. Thus above mentioned rate changer 33 and sliding gear 39 and clutch 41 may be coordinately controlled, in the present instance by fluid pressure responsive to a manually operable member or speed selective device generally denoted by numeral 255, Figs. 7 and 14, corrections of the spindle rate to compensate for losses in the hydraulic portion of the mechanism or for variations in the speed of the prime mover 8 or changes arising from other causes being automatically made by suitable means in the present instance including a speed responsive device generally denoted by numeral 256, the two controls cooperating through suitable means such as a control valve generally denoted by numeral 257, Figs. 7 and 19.

A source of fluid under pressure for effecting the various adjustments for controlling the rate as above outlined is provided in the form of a fluid pump generally denoted by numeral 258, Figs. 3 and 5, the pump comprising gears 259 and 260 meshed together within a suitable housing 261 conveniently disposed in column 1 and in the present instance formed by part of the above described pump housing 76, as more particularly shown in Fig. 3. Gear 259 is fixed with and driven from above mentioned shaft 135, the shaft passing through the bore of sleeve 77 into housing 261. The pump is accordingly driven at all times when motor 8 is in operation, regardless of the condition of engagement of clutch 31, fluid pressure accordingly being available for operation of the rate change devices whether or not spindle 2 is operating. Casing 261 provides inlet and outlet ports 262 and 263, Fig. 5, respectively, the pump being of a well known rotary gear type.

To compensate for a momentary demand of fluid in excess of the capacity of pump 258, an accumulator for fluid under pressure is provided comprising a piston 264 slidable in a suitable cylinder or bore 265 in casing 261 and pressed upwardly by a spring 266 of a strength suitable to provide the desired fluid pressure. The spring is retained in bore 265 by means of a plug, or the like, 267, fixed in the bore, and fluid discharged from outlet port 263 escapes through a check valve 268 of any suitable or well known type and finds its way into bore 265 on the side of piston 264 opposite from spring 266 through a port 269. The pressure fluid entering through port 269 depresses piston 264 and compresses spring 266.

Fluid for pump 258 is drawn from above mentioned reservoir 80 through a suction pipe 270, the pipe being provided with a strainer, or the like, 271 for obvious purposes, the fluid flowing through above mentioned bore 265 to a passage 272 leading to inlet port 262. At a predetermined point in the accumulation of fluid, piston 264 in its downward movement covers the entrance of passage 272, preventing further access of fluid to the pump and thereby stopping the further accumulation of fluid in bore 265 above piston 264. Fluid under pressure for use in the rate control or other mechanism is conducted from a chamber 273 in communication with port 269 and check valve 268 through a duct 274, release of fluid through this duct allowing piston 264 to rise under the influence of spring 266 and uncovering passage 272, whereupon further fluid will be pumped in order to restore the supply in bore 265.

Duct 274, as shown in Fig. 7, leads to an inner member or portion 275 of valve 257, the duct having a flexible portion 276 to permit movement of member 275. Other ducts 277 and 278 lead from an outer member or portion 279 of valve 257, these ducts also having flexible portions to permit movement of the outer member. Relative movement of inner and outer members 275 and 279 respectively will cause, as will be fully described presently, changes in the rate of spindle 2, manually controlled member 255 being connected to shift outer member 279 to produce a desired rate in spindle 2 and inner member 275 being movable from above mentioned speed responsive device 256 to arrest further rate change in spindle 2 whenever the spindle has arrived at the rate desired and for which member 255 has been set, any deviation from this rate of spindle 2 causing through member 256 appropriate movement of member 275 to initiate a correction in the rate of the spindle in a direction to restore the predetermined speed, this change in rate being in turn arrested by a further movement of inner member 275 responsive to member 256.

Valve member 257, as more particularly shown in Fig. 19, is constituted as follows: Inner member 275 is in the form of an elongated plunger, fluid from duct 274 being introduced into a central axial passageway 280 through a port 281 connecting with flexible portion 276 of duct 274. Plunger 275 is suitably fitted in a bore of outer member 279 and has a pressure groove 282 communicating with passage 280 through a port 283. Exhaust grooves 284 and 285 extend from the region of groove 282 spaced therefrom to provide ungrooved portions 286 and 287. In the normal or stable operative condition of the mechanism portions 286 and 287 register respectively with ports 288 and 289 formed in outer member 279 and communicating respectively with the flexible portions of ducts 277 and 278. Displacement of inner member 275 to the left as shown in Fig. 20 will accordingly provide passage for fluid from groove 282 through port 288 to duct 277, fluid returning through duct 278 exhausting through groove 285 to reservoir 80. This, through mechanism presently described, will tend to cause an increase in speed of spindle 2. On the other hand, displacement of outer member 279 to the right as shown in Fig. 21 will bring about a similar relation between the grooves and ports and effect a similar result, pressure fluid then flowing through port 289 and duct 278 and spent fluid returning through duct 277 being exhausted to reservoir 80 through port 288 and groove 284. In the present instance such opposite displacement of member 275 or member 279 will produce the opposite result or a slowing of spindle 2. Through the medium of speed responsive device 256 member 275 will be moved as soon as the rate of spindle 2 reaches the desired value into a new position of registration of portions 286 and 287 with ports 288 and 289, the system then remaining in a stable condition until something causes another displacement of either member 275 or 279.

Manually operable member 255 comprises a crank, or the like, 290, Figs. 14 and 15, fixed with a shaft 291 journaled in saddle 4, as particularly shown in Fig. 14, the shaft driving, through a spiral gear, or the like, 292, a gear 293 fixed with a shaft 294 journaled in a housing portion 295 fixed with knee 3. Shaft 294 drives, through a drive shaft generally denoted by numeral 296, a shaft 297, Figs. 8, 9. Shaft 297 drives, through bevel gears 298 and 299, a shaft 300 extending upwardly into a housing 301, Figs. 14 and 15, fixed with column 1, the shaft carrying fixed therewith a bevel gear 302 meshed with a bevel gear 303 fixed with a shaft 304 also journaled in housing 301 and having a crank, or the like, 305 fixed therewith. Shaft 297 is thus operable from either crank 290 or crank 305, the one being located at a convenient point on the front on saddle 4 and the other on the side of column 1, spindle rate changes being thus readily effected from two convenient operating positions. Crank 290 operates adjacent a chart, dial, or the like, 306, provided with suitable graduations or markings as shown to indicate positions of the shifting mechanism and traversed by an index member 307 fixed with crank 290 for indicating the positions of the shifting mechanism. The dial may be graduated in increments of any desired character, but it is contemplated to arrange it to indicate directly the spindle speeds to be expected from the various positions of crank 290. Crank 305 is also provided with an index member 308 cooperating with suitable markings or graduations on a chart or dial 309 for similar purposes.

Shaft 297, as particularly shown in Figs. 7 and 9, is journaled in a suitable bearing 310 fixed with a wall of column 1 and carries fixed therewith a gear 311 meshing with a rack portion 312 extended from a collar 313 fixed with outer portion 279 of valve 257. Shifting of either of cranks 290 and 305 accordingly will cause a change in position of valve member 279 and a change in the spindle rate as outlined above. Drive shaft 296 is of the general type of above described drive shaft 144 and comprises housings 314 and 315, Fig. 14, pivoted respectively to column 1 and housing 295, the housings being connected by a shaft 316. Housing 314, as particularly shown in Figs. 8, 9, has a sleeve portion 317 journaled in a suitable bore in a housing 317a enclosing above mentioned gears 298 and 299, the parts being retained in position by a bevel gear 318 or by other suitable means, not particularly shown. Bevel gear 318 is fixed with shaft 297 and meshes with a bevel gear 319 journaled by means of an elongated hub portion 320 in a portion of housing 314, hub 320 being prevented from axially moving relative to housing 314 by suitable means such as a collar 321 and the sleeve being slidably keyed with shaft 316. Housing 315, Fig. 8a, is pivoted on a sleeve 322 journaled in a suitable bore coaxial with shaft 294, the shaft carrying a bevel gear 323 meshed with a bevel gear 324 fixed with shaft 316. Shaft 316 is journaled in a bearing 325 fixed with housing 315, the housing accordingly pivoting about sleeve 322 in response to changes in the angular relation between shaft 316 and knee 3. Gear 292 is slidably keyed with shaft 291 sliding through the gear and housing 295 upon movements of saddle 4 relative to knee 3. The sliding connection between shaft 316 and sleeve 320 permits axial movement of shaft 316 in accordance with changes in the center distance between shafts 294 and 297 and housing 314 is provided with an extension 326 to cover the otherwise projecting end of shaft 316. It will be noted from Figs. 8a and 15 that gears 318 and 323 are disposed on opposite sides of shaft 316. As in the case of drive shaft 144, this is done to prevent changes in the angle of shaft 316 from affecting the relative positions of cranks 290 and 305. Thus rotation of shaft 316 caused by rotation of housing 314 about shaft 297, assuming the latter stationary, will be neutralized by rotation of housing 315 about shaft 294, shaft 294 accordingly remaining stationary and the angular relation between the two cranks being maintained.

Speed responsive member 256 may be of any suitable or well known type, but for purposes of illustration in the present instance is indicated as a centrifugal speed responsive mechanism resembling a familiar type of governor. It comprises a vertical shaft 327, as particularly shown in Fig. 7, journaled in bearings 328, 329 fixed with a closure member 330 supported on the column 1, the shaft being driven from spindle 2 through gear 331 fixed with the spindle and driving, through gear 332, a shaft 333 suitably journaled in column 1 and driving shaft 327 through bevel gears 334 and 335. The speed of shaft 327 is accordingly always proportional to that of spindle 2. Shaft 327 carries the governor mechanism including a yoke member 336 fixed therewith adjacent bearing 328 and a second yoke member 337 slidably keyed with shaft 327 in the neighborhood of bearing 329. The yokes are connected by two or more sets of links such as 338 and 339, the links being pivoted together at 340 and pivoted at their respective free ends with yokes 336 and 337. The yokes carry on their pivots 340 suitable weights or balls 341, the balls tending under centrifugal force to increase their radius of rotation about shaft 327, thereby increasing the angle between links 338 and 339 and raising yoke 337, this movement of balls 341 being restrained and controlled by suitable springs, or the like, 342.

The springs may obviously be chosen with any desired characteristics and in the present instance are of such a ratio of flexibility as upon extension, to increase any resistance sufficiently more rapidly than the increase in centrifugal force caused by a mere increase in the radius of the arc of travel of balls 341, as to result, in the complete mechanism, in a wide range of operating speeds thereof, each new speed resulting in a new stable position of the parts, the maximum desired speed resulting in the highest possible position of yoke 337 and the lowest speed resulting in the lowest position of yoke 337. The position of yoke 337 determines the position of inner member 275 of valve 257, yoke 337 having an annular groove 343 engaging a fork portion 344 of a lever 345 fulcrumed on a stud 346 suitably supported from closure member 330 and actuating member 275 through a sector portion 347 engaging a suitable rack portion 348 fixed with valve member 275. Thus valve member 275 will take up a definite position for each desired speed of spindle 2, any deviation from this speed resulting in a change in the position of the valve member and initiating corrective movements in the rate change mechanism as above suggested.

Obviously any suitable speed responsive device, however remote from that disclosed, which will produce a similar effect on valve member 275, will be equally effective in the determination of spindle rates and would be entirely within the contemplation of the present invention, it being merely necessary that the device, whatever type it is, be adapted to determine a series of positions of the valve member in response to a corresponding series of speeds.

Above mentioned ducts 277 and 278, Figs. 3, 7, and 19, lead respectively to ports 349 and 350, Fig. 3, in above mentioned cylinder 86. Thus upon an increase in speed in spindle 2 resulting, as above outlined, in a downward movement of plunger 275, fluid will be admitted to duct 278, the fluid flowing through port 350, Fig. 3, forcing valve member 84 to the left to reduce the effective area of port 87, fluid in the opposite end of cylinder 86 escaping through port 349, duct 277, port 288, and groove 284 to reservoir 80. The reduction in area of port 87 will cause a reduction in speed of fluid motor 73 and accordingly of spindle 2, the reduction in speed causing through speed responsive member 256 an upward movement of valve 275 and stopping the flow of fluid through ducts 278 and 277 and thus holding valve member 84 in its new position. A reduction in speed of spindle 2 will cause upward movement of valve member 275 and accordingly flow of fluid through duct 277 and port 349, thus causing movement to the right of valve member 84 in Fig. 3 and an increase in the effective area of port 87, resulting in an increase in the rate of spindle 2, this action being arrested when the spindle speed reaches the correct value as in the above explained situation.

Outer member 279 of valve 257 may be set by hand from either of cranks 290 or 305 to a position corresponding to the desired spindle speed. Fluid then flows through the appropriate duct according to whether this desired speed is faster or slower than that obtaining in spindle 2, the appropriate change in rate being initiated and the member 275 following, in response to device 256, the movement of outer member 279. When spindle 2 reaches the desired speed the two members correspond as above outlined.

In the event that a change of speed is desired which is greater than the range available in rate changer 33, the above described action will take place until piston head 85 on valve member 84 reaches the limit of its possible travel, for example, to the right as seen in Fig. 3. If this has not resulted in the speed desired, fluid will continue to flow into duct 277 and build up an abnormal pressure in cylinder 86 and the above mentioned duct. This pressure will overcome a resistance member generally denoted by numeral 351, Fig. 7, and fluid will flow through a duct 352 to port 103 in cylinder 102, Fig. 4. This will result in shifting gear 39, Fig. 7, out of engagement with gear 40 and engaging clutch member 97 with gear 42. A new series of high speeds is thus automatically made available and upon spindle 2 reaching the desired speed, speed responsive device 256 again moves valve member 275 into correspondence with outer member 279, throttle valve member 84 taking a position to maintain the desired speed in the spindle.

In the event that a low speed of spindle 2 is desired when clutch member 97 happens to be engaged with gear 42, the opposite action will take place as follows: Throttle 84 will tend to close until piston head 85 reaches the limit of its travel to the left, as seen in Fig. 3, sufficient fluid still being admitted to result in too high a speed of spindle 2 at the prevailing gear ratio. An abnormal pressure is accordingly built up in duct 278, overcoming a second resistance member generally denoted by numeral 353, Fig. 7, and permitting fluid to flow through a duct 354 to above mentioned port 104, Fig. 4, in cylinder 102. This will disengage clutch member 97 and engage gear 39 with gear 40, throttle 84 then taking a position under the influence of speed responsive device 256 and valve 257 to maintain spindle 2 at the new desired rate. Thus any speed within the range of the mechanism may be obtained in spindle 2 by merely setting either of cranks 290 or 305 at the desired point, the adjustment being first made upon throttle 84 in response to speed responsive device 256 and, if the change desired falls without the available range controlled by throttle 84, the gearing between motor 73 and spindle 2 will be shifted to make available a new range.

Resistance members 351 and 353 are provided to insure that throttle valve 84 will be shifted throughout its full range of travel before a change is made in the gearing. They are alike and accordingly it will be necessary to describe only one. As particularly shown in Fig. 10, each resistance member comprises a body portion 355 provided with an inlet port 356 with which duct 277 communicates. Fluid flows from duct 277 through the device and out through above mentioned duct 352, the desired resistance to such flow being produced by means of a ball valve 357 pressed against a suitable seat in a bore 358 by means of a spring 359 retained in the bore by means of an adjustable plug, or the like, 360, the plug being adjustable up or down to change the degree compression of the spring and accordingly determine the value of the resistance to fluid flow offered by ball 357. A lock nut 361 may be provided if desirable to maintain plug 360 in adjustment. Fluid finds its way from bore 358 through a passage 362 into a port 363 communicating with above mentioned duct 352. To provide for a return flow of fluid which occurs as above explained during return movements of piston 101, a by-pass is arranged containing a check valve to prevent short circuiting of the resistance producing valve 357. Thus a ball valve 364 is pressed against a suitable seat between port 363 and a bore 365 by means of a light spring 366 retained in the bore by means of a plug 367, the spring yielding to allow fluid to pass from port 363 around ball 364 into bore 365 and thence through a passage 368 to port 356 and on through duct 277. Provision is accordingly made for flow of fluid to and from either end of cylinder 102, but not without a certain predetermined amount of resistance which will insure the full operation of throttle valve 84 before shifting of gear 39 and clutch member 41. Thus the first adjustment in response to setting of either of cranks 290 or 305 will take place on the throttle, and then if the range provided by the rate changer is insufficient, the gears will be shifted and correction made on the throttle for the desired speed within the newly available range.

While the shifting mechanism or control device above described is here shown in combination with a rate changer in part hydraulic and in part mechanical, it is likewise contemplated for use with a purely hydraulic type, as, for instance, the one shown in the previous application above referred to. In such case the control device here shown for shifting the throttle would instead be connected for shifting the variable pump, while the control device here shown for shifting the mechanical portion of the rate changer into its two effective positions would instead be similarly connected for the shifting of the variable hydraulic motor of the other application to its two effective positions.

It is also to be noted that a variety of other arrangements could likewise be used, as, for instance, the pump and motor of the application referred to could readily be connected for adjustment from a single element, as is shown for similar units in a preceding patent to Thoma, 1,656,544, issued January 17, 1928. In such case such element would be operated to give the entire range of rates from a device such as is here shown for varying the output of pump 72 to give the partial series of rates.

For various reasons it may be desirable to determine the speed of spindle 2, for example, as a check upon the operation of the rate change mechanism and for other reasons, and, in the present instance, the speed is indicated on dials 369 and 370, Figs. 14 and 15, by mechanism actuated from speed responsive device 256, as follows:

Lever 345, Figs. 7, 14, and 19, actuates through an arm 371 and a pivoted link 372 a lever 373 pivoted on a stud 374 suitably supported in column 1, the lever actuating through a sector portion 375 a slidable rod 376 extending upwardly in column 1. Rod 376 actuates through suitable rack teeth and an idler 377 a rod 378 spaced outwardly from rod 376, slidable in the column and actuating a gear 379, Figs. 3 and 16, fixed with a shaft 380 journaled in a housing 381, the shaft extending outwardly through a bearing 382 and dial 369 and having fixed therewith a pointer or index 383. Pointer 383 indicates the spindle speed against dial 369 which may be graduated in revolutions per minute or any other convenient increments, the pointer actuating mechanism then being suitably proportioned. For convenience dial 369 might be graduated similarly to above mentioned dial 309, it then being obvious at a glance, from the relative positions of the pointers 308 and 383, whether the desired speed is being maintained. The spindle speed is also indicated on dial 370 by means of a pointer 384, Figs. 14 and 15, fixed with a shaft 385 journaled in housing 381 and driven from shaft 380 through bevel gears 386 and 387. Suitable or well known means, not shown, may be used if desirable to eliminate errors due to back lash or other characteristics of the indicating mechanism, and various changes and modifications are contemplated within the scope of the claims.

The above being a complete description of an illustrative embodiment of the invention, what is claimed is:

1. In a machine tool, the combination of a transmission comprising a driven element, a rate changer for driving said element including a plurality of adjustable rate change devices serially connected for each device to modify the rate of said element; and control mechanism for said transmission including power means connectible for adjusting each of said devices, means controlling the operation of said power means in accordance with the rate of said element, and mechanism adjustable for different control effects of said controlling means.

2. In a machine tool, the combination of a transmission comprising a driven element, a rate changer for driving said element including a plurality of adjustable rate change devices serially connected for each device to modify the rate of said element; and control mechanism for said transmission including a chart having markings corresponding to a series of rates comprised within the rate change effect of said rate changer, a member movable adjacent said chart, power means connectible for adjusting each of said devices, and means controlling the operation of said power means including a first portion movable for the selection of a preferred rate, a second portion movable in accordance with the rate of said element, and another portion movable to effect a connection of said power train in accordance with the relative position of said first and second portions, said first portion being connected for movement with said member.

3. In a milling machine, the combination of a base, a tool spindle rotatably supported from said base, a work table supported from said base for reciprocatory movement in a direction transverse to the axis of said spindle, power means for movement of said table, a transmission for rotation of said spindle including a plurality of rate change devices each shiftable in one direction for speed reduction and in the other direction for speed increase, said devices being serially connected for one to derive motion through the other and for each to modify the rate of said spindle, and control mechanism for said rate change devices including a speed selective device, a power train connectible for adjustment of each of said rate change devices in either of said directions, and means for connecting said power train for movement of one of said devices in its speed reducing direction whenever the speed of said spindle is in excess of the speed selected by said speed selective device, and in the other direction whenever the speed of said spindle is less than said selected speed.

4. In a machine tool, the combination of a rotatable spindle, a support adjacent thereto, said spindle and support being relatively bodily movable, a transmission for rotation of said spindle, a transmission for said bodily movement, rate change means for one of said transmissions including a plurality of rate change devices serially connected for one to derive motion through the other, one of said devices being shiftable to a variety of positions productive of a series of rate changes having relatively small increments of difference in rate effect; and control mechanism for said rate change means including a movable rate selector, a movable speed responsive device driven through the last mentioned rate change device, a power train connectible to shift said last mentioned device in either of said directions, and means operable in accordance with the relative positions of said selector and speed responsive device for connecting said power train to shift said last mentioned rate change device.

5. In a milling machine, the combination of a supporting structure, a table supported therefrom for reciprocatory movement, said structure providing a portion uprising adjacent a longitudinal edge of said table and at one side of a vertical plane passing through said edge, a tool spindle rotatably supported from said structure portion in a position at a level above said table and axially transverse to the path of table movement, a transmission for rotation of said spindle including a plurality of rate change devices each shiftable in one direction for speed reduction and in the other direction for speed increase, said devices being each connected for adjustment thereof to alter the rate of said spindle, one of said devices having a variety of positions of adjustment productive of a series of rates having relatively small increments of difference in rate; and control mechanism for said transmission including a movable rate selector having a portion positioned for manual adjustment at the other side of said vertical plane, a power train connectible for shifting the last mentioned rate change device in either of said directions, a movable speed responsive device driven from said last mentioned rate change device, and means operable in accordance with relative positions of said speed selector and speed responsive device for connecting said power train to shift said last mentioned rate change device.

6. In a milling machine, the combination of a supporting structure, a table supported from said structure for horizontal reciprocatory movement, said structure providing a portion uprising adjacent a longitudinal edge of said table and at one side of a vertical plane passing through said edge, a tool spindle rotatably supported from said structure portion in a position at a level above said table and axially transverse to the path of table movement, a transmission for rotation of said spindle including a hydraulic variable rate device; and control means for said device including means adjustable to a variety of positions collectively productive of a plurality of different rates, a power train connectible with said device for adjustment thereof into any of said positions, and means controlling the connection of said power train for selectively determining a preferred position of adjustment of said device and including an element exposed for manual operation at the other side of said vertical plane, said power train including a hydraulically operable shifter and a source of pressure fluid for operation of said shifter, and said exposed element being operative to control the connection of said fluid source and shifter.

7. In a milling machine, the combination of a supporting structure, a table supported from said structure for horizontal reciprocatory movement, said structure providing a portion uprising adjacent a longitudinal edge of said table and at one side of a vertical plane passing through said edge, a tool spindle rotatably supported from said structure portion in a position at a level above said table and axially transverse to the path of table movement, a transmission for rotation of said spindle including a hydraulic variable rate device; and control means for said device including means adjustable to a variety of positions collectively productive of a plurality of different rates, a power train connectible with said device for adjustment thereof into any of said positions, and a rate selector including an element movable for selectively predetermining the connection of said power train to effect a preferred one of said positions of said device and movable independently of the position of adjustment of said device and in advance of the adjustment thereof to said preferred position, said power train including a hydraulically operable shifter and a source of pressure fluid therefor, and said selector being operative to control the connection of said source with said shifter.

8. In a milling machine, the combination of a column, a tool spindle rotatably supported therefrom, a knee supported therefrom for vertical movement, a table supported from said knee for bodily vertical movement therewith and for horizontal reciprocatory movement in a direction transverse to the axis of said spindle, said column providing a portion uprising for the support of said spindle adjacent a longitudinal edge of said table and at one side of a vertical plane passing through said edge, a transmission for rotation of said spindle including a plurality of rate change devices each in part shiftable in one direction for speed reduction and in the other direction for speed increase, said devices being serially connected for the one to drive said spindle through the other, one of said devices including a hydraulic transmission and the shiftable portion of said device being adapted to change the rate of fluid flow in said hydraulic transmission; and control means for said transmission including hydraulic means for shifting said shiftable portion, a fluid source for said hydraulic means and a rate selective means operable to control the connection of said fluid source and shifter, said rate selective means including a portion bodily vertically movable with said knee and exposed for manual operation at the other side of said vertical plane.

9. In a milling machine, the combination of a column, a tool spindle rotatably supported therefrom, a knee supported therefrom for vertical movement, a table supported from said knee for bodily vertical movement therewith and for horizontal reciprocatory movement in a direction transverse to the axis of said spindle, said column providing a portion uprising for the support of said spindle adjacent a longitudinal edge of said table and at one side of a vertical plane passing through said edge, a transmission for rotation of said spindle including a plurality of rate change devices each in part shiftable in one direction for speed reduction and in the other direction for speed increase, said devices being serially connected for the one to drive said spindle through the other, one of said devices including a hydraulic transmission and the shiftable portion of said device being adapted to change the rate of fluid flow in said hydraulic transmission; and control means for said transmission including power operable shifting means for said shiftable portion of said hydraulic transmission, speed responsive means driven through said spindle transmission and a rate selective device comprising an adjustable element bodily vertically movable with said knee and having a portion exposed for manual operation at the other side of said vertical plane, said shifting means being in part responsive to the position of adjustment of said element and in part responsive to the position of said speed responsive means.

FRED A. PARSONS.